A. K. SLOAN.
CONDENSER.
APPLICATION FILED AUG. 7, 1912.

1,150,895.

Patented Aug. 24, 1915.
5 SHEETS—SHEET 1.

WITNESSES

INVENTOR
A. Kellogg Sloan,
BY
ATTORNEY

A. K. SLOAN.
CONDENSER.
APPLICATION FILED AUG. 7, 1912.
1,150,895.
Patented Aug. 24, 1915.
5 SHEETS—SHEET 2.
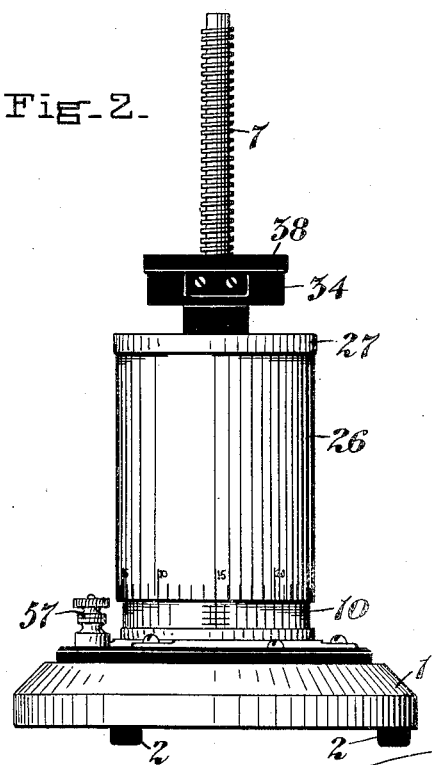
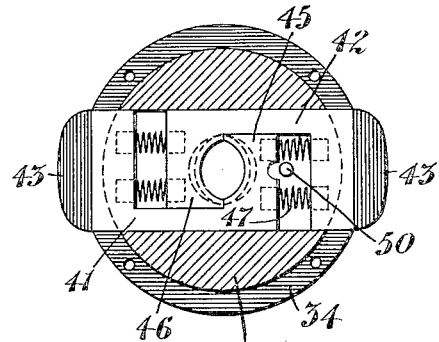
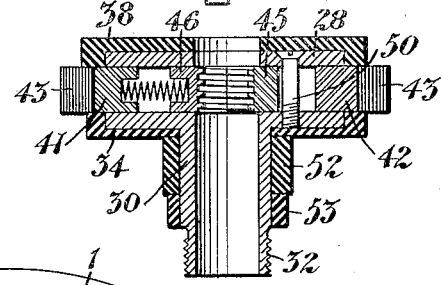
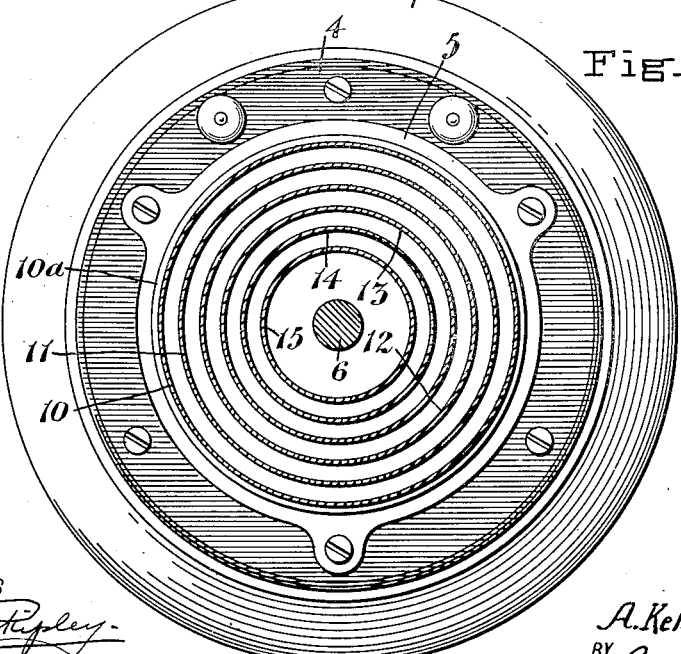
WITNESSES
INVENTOR
A. Kellogg Sloan,
BY
ATTORNEY

A. K. SLOAN.
CONDENSER.
APPLICATION FILED AUG. 7, 1912.

1,150,895.

Patented Aug. 24, 1915.
5 SHEETS—SHEET 3.

WITNESSES

INVENTOR
A. Kellogg Sloan,
BY
ATTORNEY

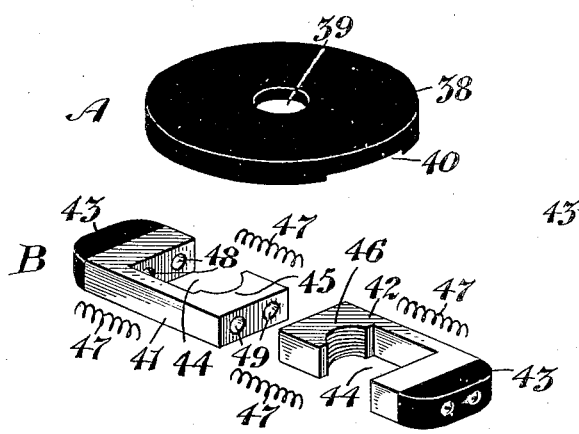

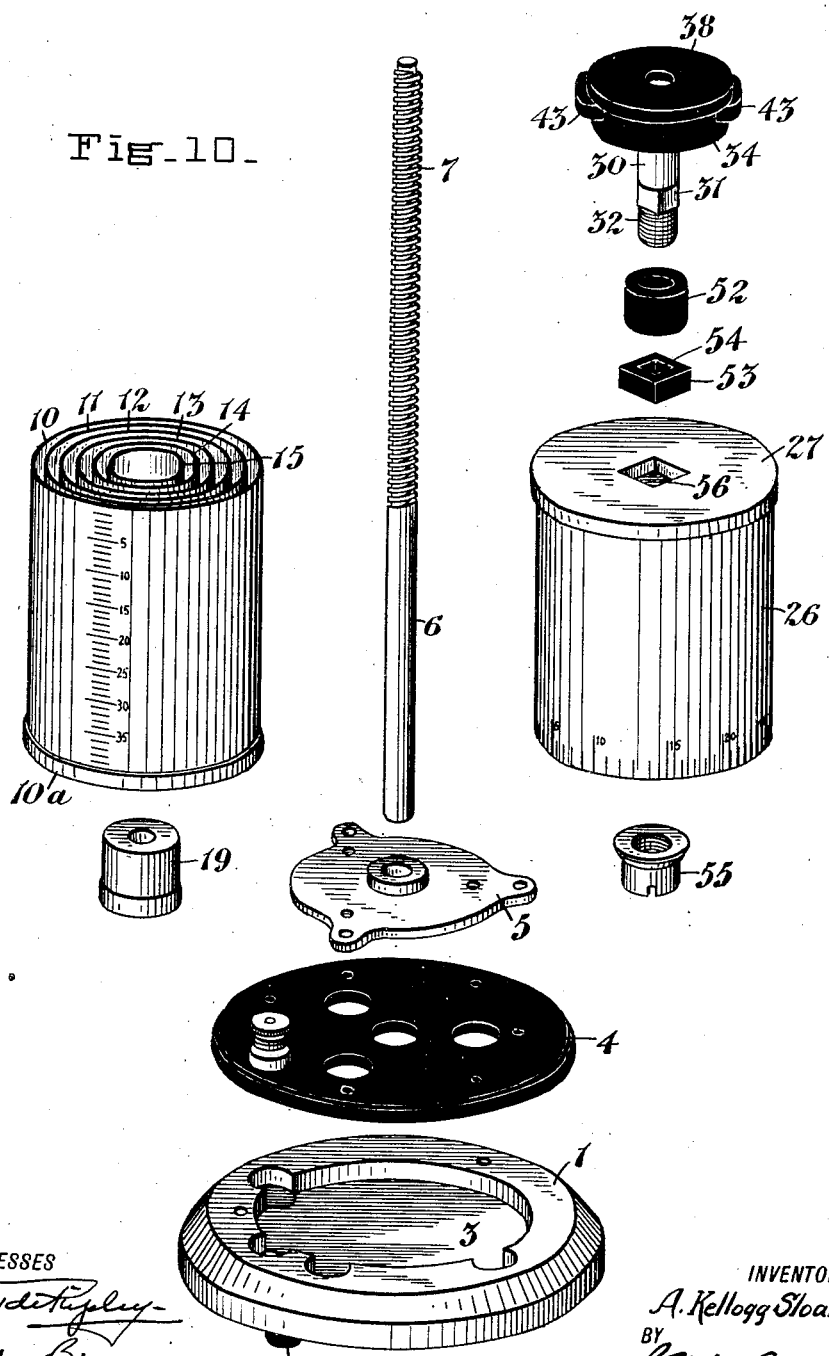

UNITED STATES PATENT OFFICE.

AUGUSTUS KELLOGG SLOAN, OF BROOKLYN, NEW YORK.

CONDENSER.

1,150,895.  Specification of Letters Patent.  Patented Aug. 24, 1915.

Application filed August 7, 1912. Serial No. 713,793.

*To all whom it may concern:*

Be it known that I, AUGUSTUS KELLOGG SLOAN, a citizen of the United States, and a resident of Brooklyn, in the county of Kings and State of New York, have invented certain new and useful Improvements in Condensers, of which the following is a specification.

The invention relates to electrical condensers or high-potential accumulators and more particularly to a condenser of adjustable capacity of a type suitable for use with high potential electric currents such as are used in radio transmission; transmitters and receptors.

More specifically, it pertains to a condenser, the capacity of which may be varied and adjusted with both accuracy and facility.

The objects of the invention are to provide a condenser of extremely simple and compact form having a maximum capacity for the materials used and incidentally adjustable to various capacities with little or no liability of breakage or disarrangement.

A further object is to provide a condenser having a plurality of units so arranged in conjunction with a self-healing dielectric as to give a maximum of surface as to the electrodes with a minimum of space occupied, thus providing a portable and readily adjustable device.

A still further object is to provide a condenser having its units so arranged that they may be used for various purposes and may be adjusted to various capacities by a quick general adjustment and a subsequent fine adjustment.

Figure 1:
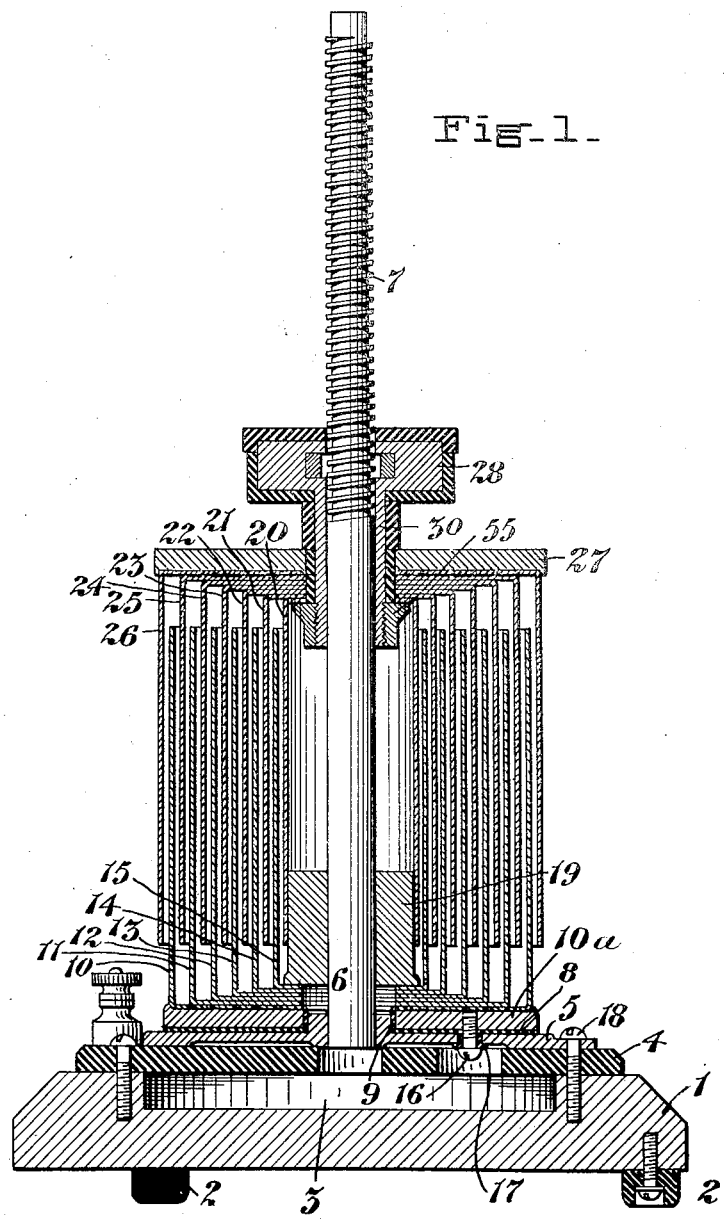
Figure 6:
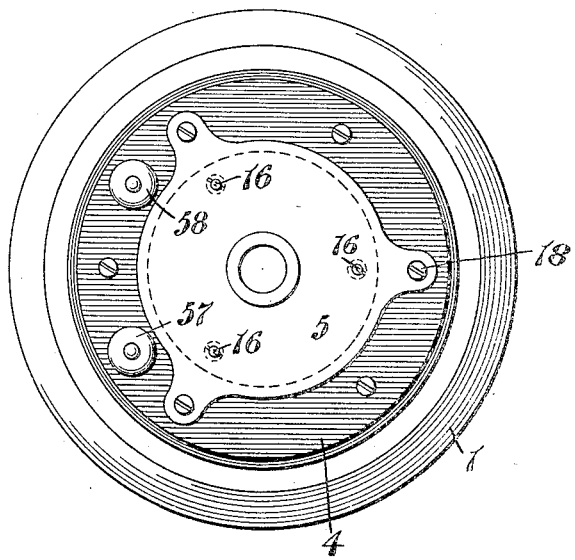
Figure 7:
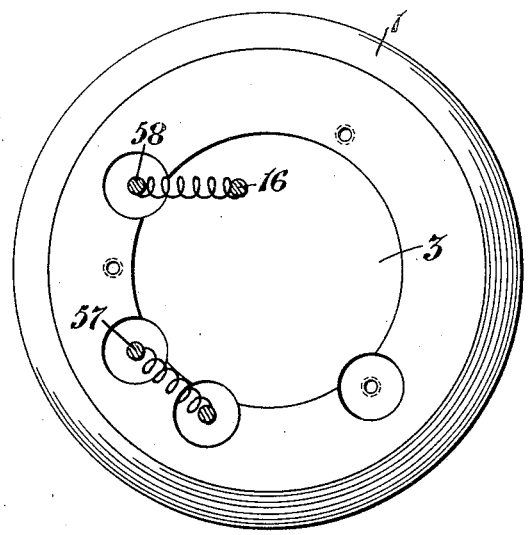

Referring to the drawings: Figure 1 is a vertical sectional view through the device. Fig. 2 is a view in elevation in reduced scale as compared with Fig. 1, showing the scales and calibration for securing the accurate adjustments. Fig. 3 is a cross-sectional plan view through the stationary electrode with the movable electrode removed. Fig. 4 is a vertical section through the adjusting device. Fig. 5 is a plan view of the nuts of the adjusting device and base with the cap removed, illustrating the adjusting nuts in closed position. Fig. 6 is a plan view in reduced scale as compared with Figs. 1 and 2, illustrating the base, supporting plates and spindle for the electrodes. Fig. 7 is a similar plan view with the supporting plates and appurtenant parts removed. Fig. 8 is a perspective view of the various elements of the adjusting device illustrating at A the cap; at B, the adjusting nuts and springs; at C, the housings and at D the shell of the casing. Fig. 9 illustrates in plan the casing, adjusting nuts, and appurtenant parts, said nuts being in engagement with the threaded spindle. Fig. 10 illustrates in unassembled position the various elements of the structure, the parts being shown in perspective.

It has been heretofore common practice to use fixed or variable condensers with paper, paraffin, mica, fiber, rubber and other dielectrics. To obtain the advantages of using the atmosphere as a dielectric, the rotary plate condenser has been devised and has introduced the weakness of flat plates and their tendency to warp or short circuit, thus varying the total capacity of the instrument in a manner which renders it useless at times. By using cylinders as the electrode instead of a plate, great rigidity and compactness is gained and the disadvantages of the plate are obviated and the advantages are retained without introducing new faults.

It is one of the principal objects of the present invention to provide a device of a form having its electrode so arranged that there will be little or no liability of buckling or breaking down and at the same time, providing a very compact device which may be readily adjusted to various capacities and wherein the adjustment may be made almost instantaneously within certain degrees and may be quickly adjusted with the highest degree of accuracy.

In general, the device consists of a base or support upon which is mounted a stationary electrode comprising a series of nested tubular members coöperating with which are a similar set of nested tubular members supported by a spindle and connected with the spindle through an adjusting device which permits a quick insertion or removal of the members with reference to the stationary elements and also provides for a delicate adjustment thereof.

Referring to the drawings, the numeral 1 denotes a base or support preferably mounted upon insulating feet 2 and having an internal chamber or opening 3. Upon the base is an insulating plate 4. Suitably mounted upon this insulating plate 4 is a spindle supporting plate 5 centrally arranged in which is a spindle 6, the upper end of which is provided with a coarse-pitch screw thread 7.

Mounted upon the spindle supporting plate 5, though completely insulated therefrom by the insulating members 8, 9, is a plate 10ᵃ, which acts as the direct support for a series of tubular cup-shaped members 10, 11, 12, 13, 14, and 15, gradually decreasing in diameter and nested one within the other. These elements are evenly spaced with reference to each other and are insulated from the spindle 6 and its plate and securely brazed or secured to each other and to the stiff supporting plate 10ᵃ. This structure forms the stationary electrode of the condenser. The plate 10ᵃ is securely held to the plate 5 by suitable screws or other device 16 insulated as at 17 from the plate 5 and the plate 5 is secured to the base 1 by suitable screws 18. A plug 19 serves as an additional support for the spindle 6 and has the added function of forming a guide for the innermost members 20 of a series of cup-like tubular members 20, 21, 22, 23, 24, 25, and 26. This series of cup-like members are, as in the case of the members making up the stationary electrode 10 to 15 inclusive, equally spaced and so arranged that the innermost member 20 projects within the innermost member 15 and the outermost member 26 projects over and about the outermost member 10 of the stationary electrode. The members 20 to 26 are suitably secured to each other and to a plate or cap 27, this structure forming the movable electrode of the condenser.

The outer member 10 of the stationary electrode made up of the cup-like elements 10 to 15 inclusive, has marked thereon a scale as is clearly shown in Figs. 2 and 10, said scale extending axially of the shell 10. The outer member 26 of the movable electrode having the elements 20 to 26 is provided with a scale marked around the lower peripheral edge thereof as clearly indicated in Fig. 2. The vertical scale on the member 10 is divided into a certain number of equal parts and the periphery of the member 26 is so divided in scale that practically a micrometer adjustment may be secured between the stationary and movable electrodes.

The adjusting device for the movable electrode is shown in the various figures and more particularly in detail in Figs. 1, 4, 5, 8, 9 and 10. This adjusting device consists of a holder 28 preferably of metal having a transverse slide-way 29 formed therein and with an extended hollow-spindle 30, upon which is arranged a squared or angularly formed section 31 and an externally screw-threaded section 32. The extension 30 has an opening therethrough corresponding in size and form to an opening 33 in the top of the holder, these openings being of a size to snugly fit about the supporting spindle 6. The holder 28 is completely inclosed by an insulating casing 34. This casing has a central opening 35 through which the extension 30 may pass and is provided with transverse openings 36, 37, which register with transverse opening 29 extending through holder. A cover-plate of insulating material 38 having a central opening 39 and transverse openings 40 fit snugly over the top of the holder 28 and is secured in any suitable manner as by screws to the main insulating casing.

Within the holder 28 and arranged in opposed positions, are jaw-members 41, 42, which, when in assembled position have a close-sliding engagement with and fill the opening 29. These jaw-members, as illustrated, each have at their outer end an insulating member 43 to protect the operator and are cut away as at 44 so that the threaded jaw 45 of the jaw member 41 rests within the opening 44, of the jaw member 42 and the threaded jaw member 46 of the jaw member 42 rests within the opening 44 of the jaw member 41. These two threaded jaw members 45, 46, together, form a nut for engaging the thread 7 of the spindle 6 and are normally held in close engagement therewith by springs 47, which are held against displacement in depressions 48, 49, formed respectively on the inner wall of the openings 44 and the outer ends of the jaw members. A stop pin or screw 50 passing through openings 51 in the holder prevents a movement of the jaws beyond definite points. The operation of the nut and adjusting device is apparent. A simultaneous depression with the thumb and fore-finger upon the sliding jaws carries the threaded jaw members out of engagement with the threads 7 of the spindle 6 and thereupon the plate 27 and movable electrode made up of the cup-like tubular members 20 to 26 inclusive may be raised or lowered with reference to the stationary electrode, thus decreasing or increasing the capacity value of the device. This permits a quick adjustment of the movable electrode with reference to the stationary electrode within the limits of the scale upon the stationary electrode member 10. If it is desired to secure a finer adjustment, a rotation of the adjusting device after its threaded nuts are in engagement with the screw-threads 7, will provide a means of extremely delicate vertical adjustments of the movable electrode.

The holder 28 is completely insulated from the operator by the cap 38 and shell 34 although it is in electrical connection with the spindle 6. Insulating washers 52, 53, the latter having an angularly formed perforation 54 fitting about the angular section 31 of the extended portion secures a further insulation. A nut 55 engages the threaded end 32 of the extension of the holder and securely clamps the parts in position with reference to the plate 27. With this arrangement, the entire exterior of the adjusting device is completely insulated so that the operator, upon handling the same, may not be in circuit and yet metallic parts are employed for all bearing and working portions of the device. The squared or angularly formed parts 31, 53 in conjunction with an angularly formed opening 56 formed through the plate 27 provide a convenient means for turning the movable electrode about the spindle 6.

The base or support 1 bears suitable binding posts 57, 58, one of which is suitably connected as through the screws 16 with the stationary electrode, the other being connected through suitable metallic conductors with the spindle supporting plate 5 which bears the movable electrode.

From the above it will be seen that the movable electrode may, through the adjusting device, be quickly moved to any desired position with reference to the stationary electrode merely by releasing the threaded nut sections from the spindle and raising or lowering said electrode. The electrode may be further adjusted to minute degrees by rotating same through the adjusting device after the threaded nuts are released and are in engagement with the screw thread of the spindle. It is also apparent that any number of tubular members may be employed to suit the exigencies of any particular requirement and that a condenser of very large capacity may be thus provided occupying a minimum of space. Inasmuch as the elements of the electrode are of tubular cup-like form, they may be arranged and assembled with great accuracy and there is in this tubular form the element of strength against buckling or warping which with a plate condenser would bring the elements of the movable and stationary electrode into varying conditions of proximity.

Obviously, the details of the structure might be varied to a great degree without departing from the spirit or intent of the invention which contemplates a simple and compact device having a maximum of capacity, portability and efficiency with features of quick adjustment for ordinary changes of capacity combined with a fine adjustment for more exact values of capacity.

What I claim as my invention and desire to secure by Letters Patent is:

1. A condenser comprising a base or support, a plurality of cup-like tubular metallic members of different diameters, all having their bases in electrical connection, said cups nested one within the other and forming one electrode, a series of similar cup-shaped tubular members nested one within the other, all having their bases electrically connected and forming a second electrode, the members of said second electrode adapted to be inserted between the members of the first-named electrode and means for adjusting said electrodes axially of each other.

2. A condenser comprising a base or support, a plurality of tubular metallic cup-like members having their bases united in electrical contact and supported by the base, said tubular members varying in diameter and arranged one within the other to form a stationary electrode, an adjusting spindle extending therethrough, a plurality of similar tubular cup-like members arranged one within the other and having their bases united in electrical contact and adapted to depend between the tubular members of the stationary electrode and an adjusting device operatively connected with said tubular members and the adjusting spindle whereby said tubular members may be moved axially with reference to the stationary tubular members.

3. A condenser comprising a base or support, a stationary electrode embodying a plurality of metallic tubular members all in electrical connection spaced with reference to each other, a supporting spindle insulated therefrom, a plurality of tubular members borne upon said spindle and adapted for insertion in the spaces between the tubes of the stationary electrode, an adjusting device permitting a free movement of said tubular members along the spindle and a clutching device appurtenant to the adjusting device for locking the adjusting device to the spindle and permitting further adjustment.

4. In a device of the character described, a base or support, a stationary electrode mounted thereon, said electrode comprising a plurality of tubular metallic members arranged one within the other in electrical contact and evenly spaced from each other, a movable electrode comprising a plurality of tubular members arranged one within the other in electrical contact and adapted for insertion in the spaces between the tubes of the stationary electrode, a spindle extending through the stationary electrode supporting said movable electrode and an adjusting device intermediate the electrode and spindle, said adjusting device permitting a free axial movement of the movable electrode upon its release from the spindle and providing upon rotary movement a fine adjustment.

5. A condenser comprising a base or support, a stationary electrode embodying a plurality of tubular metallic members all in electrical connection and concentrically arranged one within the other, a movable electrode comprising a plurality of similar tubular metallic members centrally arranged one within the other all in electrical contact and adapted to be inserted between the tubular members of the stationary electrode, a supporting spindle for the movable electrode extending through the center of the stationary electrode and having a screw-thread and an adjusting device connected with the movable electrode and having threaded jaws adapted to engage and disengage the threads of the spindle and an insulating casing for said adjusting device and appurtenant parts.

6. A condenser comprising a base or support, a stationary electrode embodying a plurality of tubular metallic members concentrically arranged one within the other and in electrical connection, a movable electrode comprising a plurality of similar tubular members centrally arranged one within the other and adapted to be adjustably inserted between the tubular members of the stationary electrode, a supporting spindle for the movable electrode extending through the stationary electrode and having a screw-thread, an adjusting device comprising a metallic part having movable threaded jaws adapted to engage and disengage the threads of the spindle and an insulating casing completely inclosing said body-part.

7. A condenser comprising a base or support, a stationary electrode embodying a plurality of metallic tubular members in electrical contact concentrically arranged one within the other, a movable electrode comprising a plurality of similar tubular members in electrical contact centrally arranged one within the other and adapted to be adjustably inserted between the tubular members of the stationary electrode, a stationary supporting spindle for the movable electrode extending through the stationary electrode and having a screw-thread, an adjusting device embodying a body-part secured to the movable electrode and provided with opposed threaded jaws adapted to engage the threads of the spindle, said jaws being movable within the body-part to release the spindle, resilient means for normally holding said jaws in engagement with said spindle and insulation inclosing the body-part and jaws.

8. A condenser comprising two electrodes, each consisting of a series of metallic tubular members arranged one within the other and electrically connected, the tubular members of one electrode being interposed between the tubular members of the coöperating electrode, means for insulating one electrode from the other and an adjusting device for providing an axial and rotary adjustment of one armature with reference to the other.

9. A condenser comprising two electrodes each consiting of a series of metallic tubular members arranged one within the other and each series electrically connected, the tubular members of one electrode being interposed between the tubular members of the coöperating electrode, means for insulating one electrode from the other, a scale axially arranged along one electrode, a scale arranged about the periphery of the coöperating electrode and an adjusting device permitting a free movement of one electrode with reference to the other for the axial scale and a rotary movement for the peripheral scale.

A. KELLOGG SLOAN.

Witnesses:
MARY L. BLOOMER,
M. BURLEY.